(12) United States Patent
Shutkin et al.

(10) Patent No.: US 8,850,437 B2
(45) Date of Patent: Sep. 30, 2014

(54) TWO-PASS LINEAR COMPLEXITY TASK SCHEDULER

(75) Inventors: Yurii S. Shutkin, Moscow (RU); Pavel A. Aliseychik, Moscow (RU); Elyar E. Gasanov, Moscow (RU); Ilya V. Neznanov, Moscow (JP); Andrey P. Sokolov, Moscow (RU); Pavel A. Panteleev, Moscow (RU)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 400 days.

(21) Appl. No.: 13/290,299

(22) Filed: Nov. 7, 2011

(65) Prior Publication Data

US 2012/0284731 A1    Nov. 8, 2012

(30) Foreign Application Priority Data

May 5, 2011    (RU) .................................. 2011117765

(51) Int. Cl.
*G06F 9/46*    (2006.01)
*G06F 9/50*    (2006.01)

(52) U.S. Cl.
CPC .................................... *G06F 9/5066* (2013.01)
USPC .......................................... 718/102; 718/104

(58) Field of Classification Search
None
See application file for complete search history.

(56) References Cited

U.S. PATENT DOCUMENTS

| | | | |
|---|---|---|---|
| 5,301,324 A * | 4/1994 | Dewey et al. ................. | 718/105 |
| 5,452,461 A | 9/1995 | Umekita et al. .............. | 395/700 |
| 5,822,747 A | 10/1998 | Graefe et al. ..................... | 707/2 |
| 7,461,241 B2 * | 12/2008 | Conklin et al. ............... | 712/220 |
| 7,664,940 B2 * | 2/2010 | Conklin et al. ............... | 712/220 |
| 7,707,578 B1 * | 4/2010 | Zedlewski et al. ............ | 718/102 |
| 7,814,489 B2 * | 10/2010 | Uemura et al. ............... | 718/103 |
| 7,913,254 B2 * | 3/2011 | Pospiech ....................... | 718/100 |
| 7,913,257 B2 * | 3/2011 | Nishikawa .................... | 718/102 |
| 8,166,482 B2 * | 4/2012 | Nishikawa .................... | 718/102 |
| 2005/0188373 A1 | 8/2005 | Inoue et al. ................... | 718/100 |
| 2006/0080663 A1 * | 4/2006 | Pospiech ....................... | 718/100 |
| 2006/0112390 A1 | 5/2006 | Hamaoka ...................... | 718/102 |
| 2007/0143759 A1 | 6/2007 | Ozgur et al. .................. | 718/102 |
| 2010/0153965 A1 * | 6/2010 | Arimilli et al. ............... | 718/105 |
| 2010/0153966 A1 * | 6/2010 | Arimilli et al. ............... | 718/105 |
| 2010/0251257 A1 | 9/2010 | Kim et al. ..................... | 718/105 |
| 2011/0239017 A1 * | 9/2011 | Zomaya et al. ............... | 713/320 |

* cited by examiner

*Primary Examiner* — Van Nguyen
(74) *Attorney, Agent, or Firm* — Christopher P. Maiorana, PC

(57) ABSTRACT

A method for two-pass scheduling of a plurality of tasks generally including steps (A) to (C). Step (A) may assign each of the tasks to a corresponding one or more of a plurality of processors in a first pass through the tasks. The first pass may be non-iterative. Step (B) may reassign the tasks among the processors to shorten a respective load on one or more of the processors in a second pass through the tasks. The second pass may be non-iterative and may begin after the first pass has completed. Step (C) may generate a schedule in response to the assigning and the reassigning. The schedule generally maps the tasks to the processors.

18 Claims, 8 Drawing Sheets

TWO-PASS LINEAR COMPLEXITY TASK SCHEDULER

This application claims the benefit of Russian Application No. 2011117765, filed May 5, 2011 and is hereby incorporated by reference in its entirety.

FIELD OF THE INVENTION

The present invention relates to parallel processor scheduling generally and, more particularly, to a method and/or apparatus for implementing a two-pass linear complexity task scheduler.

BACKGROUND OF THE INVENTION

Many parallel systems that have multiple processor units and multiple tasks to perform have a problem of distribution of the tasks between the processors. In common cases, a full search is made through all possible combinations of the tasks to find an optimal solution. Such full searches have exponential complexity and thus are not applicable where the tasks are not fixed, but are generated in a stream and should be scheduled on-the-fly.

Properties of the distribution among the processors sometimes make finding an optimal or nearly-optimal solution with non-exponential complexity possible. Some single tasks can be performed on multiple processor units but not in an arbitrary way. For example, memory sharing restricts how the tasks are performed. Another restriction is parallelizing overhead. When such restrictions appear, formalizing and encoding the rules of scheduling is difficult.

It would be desirable to implement a two-pass linear complexity task scheduler to accommodate on-the-fly scheduling for streams of tasks.

SUMMARY OF THE INVENTION

The present invention concerns a method for two-pass scheduling of a plurality of tasks generally including steps (A) to (C). Step (A) may assign each of the tasks to a corresponding one or more of a plurality of processors in a first pass through the tasks. The first pass may be non-iterative. Step (B) may reassign the tasks among the processors to shorten a respective load on one or more of the processors in a second pass through the tasks. The second pass may be non-iterative and may begin after the first pass has completed. Step (C) may generate a schedule in response to the assigning and the reassigning. The schedule generally maps the tasks to the processors.

The objects, features and advantages of the present invention include providing a two-pass linear complexity task scheduler that may (i) have a linear complexity based on both a number of tasks and a number of processors, (ii) provide more optimal results than a single pass scheduling technique, (iii) schedule a single task for processing on multiple processors substantially simultaneously, (iv) operate using a simple set of processor groups, (v) save processor resources, (vi) provide a small search space, (vii) reassign tasks to larger groups of processors after an original assignment to smaller groups of processors, (viii) guarantee no delays between tasks during processing, (ix) simplify processor control and/or (x) generate a task schedule in two passes.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

A two-pass linear complexity task scheduler may implement a technique (or method or process) in a program or a device for distributing linear tasks between multiple computing units. A task is generally considered as a linear program or data item with a fixed computational complexity. Consider a set of tasks to be computed where each task may have a respective computational complexity (e.g., length). A set of computing units (e.g., processors) may be used to process the tasks. Each computing unit generally has an identical computation power or capability. The task scheduler may distribute the tasks among the computing units according to some given restrictions to minimize a total time spent processing or executing the tasks. The task scheduler may be useful in high-speed computational circuits in which a full search through all possible combinations of task distributions may not be possible or practical. Some embodiments of the present invention generally have a linear complexity dependency, based on a number of input tasks and a number of processors that guarantees no bottlenecks in the circuitry.

Figure 1:
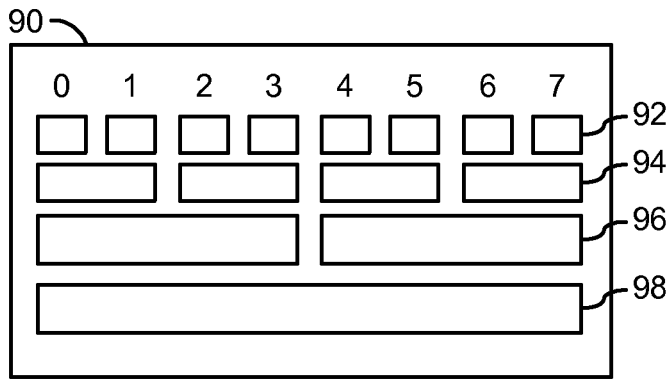
FIG. 1 is a diagram of an example group of processors.

Referring to FIG. 1, a diagram of an example group of processors 90 is shown. A number of available processors in a parallel processor apparatus may be a power of two (e.g., $2^3=8$ processors in the example). Each incoming task to be processed or executed by the processors may be scheduled to any individual processor or to a group of processors that align to the power of two. For example, scheduling of the tasks may be restricted to individual processors in row 92 and/or the following groups of processors: {0,1}, {2,3}, {4,5} or {6,7} in row 94; {0,1,2,3} or {4,5,6,7} in row 96; or {0,1,2,3,4,5,6,7} in row 98. The numbers 0-7 generally represent the individual processors. Such a scheduling restriction may be reasonable in the example due to a small number of possible scheduling arrangements, namely $8+4+2+1=(2\times8)-1=15$ possible arrangements (e.g., double the number of processors minus 1). Alternatively, scheduling the task to an arbitrary group of processors may lead to an exponential growth in the number of possible groups.

Launching and parallelizing of the tasks may create one or more restrictions for an overhead of the processors. Each task given to a processor generally consumes a minimal task execution time on the processor. Therefore, parallelizing many small tasks to multiple processors is generally not effective. A more efficient approach may be to distribute the incoming tasks among the processor groups to minimize the time spent by all of the processors to handle all of the tasks.

Figure 2:
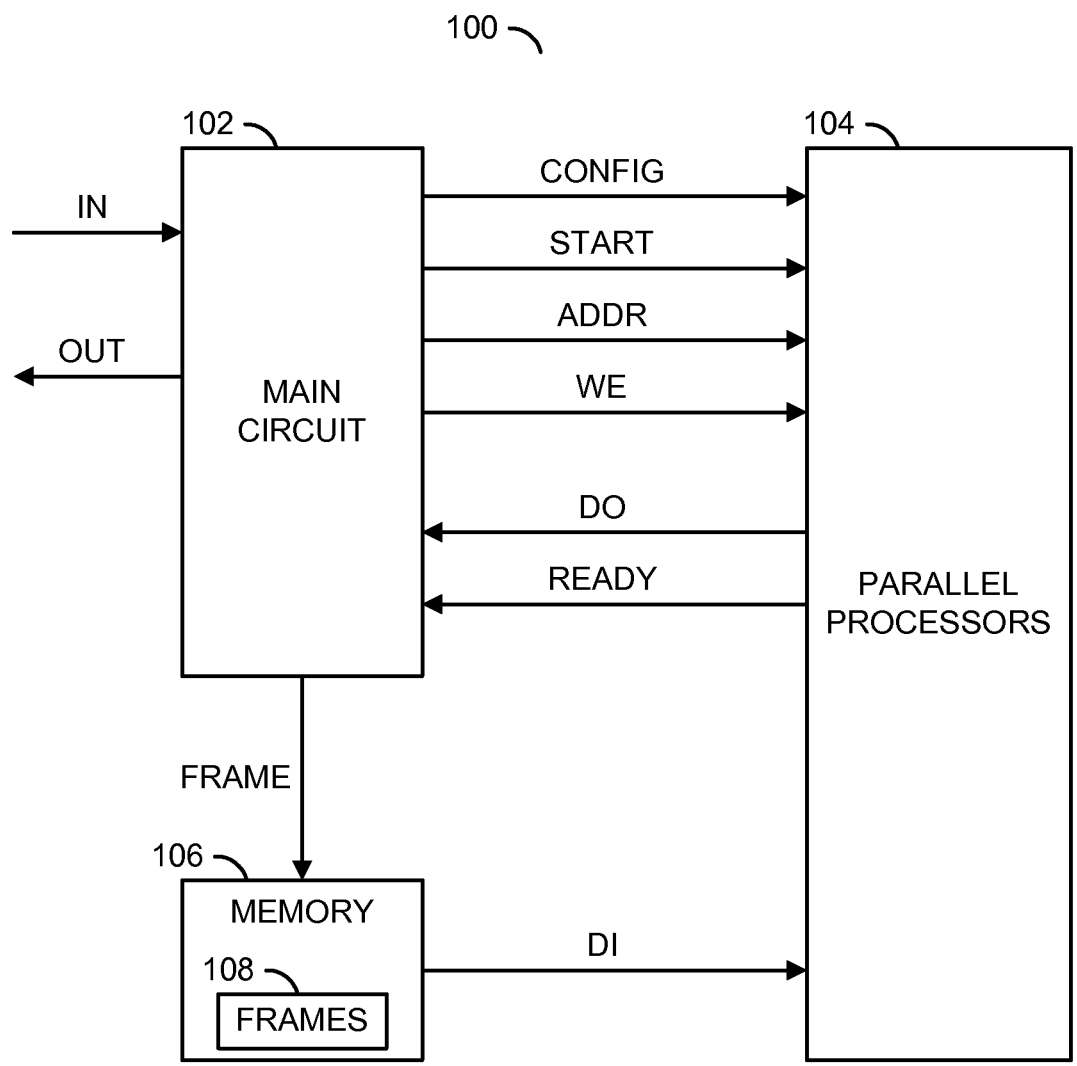
FIG. 2 is a block diagram of a circuit in accordance with a preferred embodiment of the present invention.

Referring to FIG. 2, a block diagram of a circuit 100 is shown in accordance with a preferred embodiment of the present invention. The circuit (or device, apparatus or integrated circuit) 100 may implement a parallel processor configured to process a stream of the incoming tasks. In some embodiments, the circuit 100 may implement a parallel decoder for multiple wireless communications standards. The circuit 100 generally comprises a block (or circuit) 102, a block (or circuit) 104 and a block (or circuit) 106. The circuits 102 to 106 may represent modules and/or blocks that may be implemented as hardware, firmware, software, a combination of hardware, firmware and/or software, or other implementations.

An input signal (e.g., IN) may be received by the circuit 102. The circuit 102 may generate an output signal (e.g., OUT). A signal (e.g., FRAME) may be generated by the circuit 102 and transferred to the circuit 106. The circuit 106 may generate a data input signal (e.g., DI) that is received by the circuit 104. A configuration signal (e.g., CONFIG) may be generated by the circuit 102 and received by the circuit 104. The circuit 102 may also generate a signal (e.g., START) that is received by the circuit 104. The circuit 104 may receive an address signal (e.g., ADDR) from the circuit 102. A write enable signal (e.g., WE) may be generated by the circuit 102 and presented to the circuit 104. The circuit 104 may generate a data output signal (e.g., DO) that is received by the circuit 102. A signal (e.g., READY) may also be generated by the circuit 104 and presented to the circuit 102.

The circuit 102 may implement a main circuit. The circuit 102 is generally operational to receive the input tasks (e.g., code words) in the signal IN. The signal IN may convey the tasks in either a streaming format or a block format. The circuit 102 may combine sets of the received tasks into frames 108. The resulting frames 108 are generally written by the circuit 102 into the circuit 106 via the signal FRAME. The circuit 102 may also be operational to receive a frame of processed tasks (e.g., decoded code words) from the circuit 104 in the signal DO. The processed tasks are generally presented by the circuit 102 in the signal OUT in either the frame format or in a sequential format. The circuit 102 may also be operational to generate a set of signals that control the circuit 104. The signal CONFIG may convey an identity of the particular protocol (or standard or specification) (e.g., wireless communications standard) that corresponds to the tasks buffered in the circuit 106. The signal START may notify the circuit 104 that a frame 108 is available in the circuit 106 for processing. The signal WE may be a write enable signal that indicates if the circuit 102 is writing to or reading from the circuit 104. In the write condition, the signal ADDR generally points to memory locations internal to the circuit 104 where the tasks should be initially buffered. In the read condition, the signal ADDR may point to a location within the internal memory of the circuit 104 to read the results of the processed tasks.

The circuit 104 may implement the parallel processing circuit. In some embodiments, the circuit 104 may implement a parallel decoding engine. The circuit 104 is generally operational to receive one or more frames 108 with the tasks from the circuit 106 via the signal DI. In some situations, at least two of the tasks within a frame 108 may have a different length than each other. The circuit 104 may also parse the frames 108 into multiple internal memory locations. Once the frames 108 have been parsed and buffered, the circuit 104 may generate one or more results frames by processing the tasks using a plurality of processors (e.g., decoders). The processors of the circuit 104 generally operate in parallel. In some situations, decoding of one or more of the tasks may be performed by two or more of the processors. The particular processing technique performed by the circuit 104 is generally based on configuration information received in the signal CONFIG. The configuration information may identify a current one of the multiple protocol with which the circuit 104 may be designed to operate.

The circuit 106 may implement a memory circuit. The circuit 106 is generally operational to buffer one or more frames 108 at a time as received in the signal FRAME. The circuit 106 generally presents the frames 108 to the circuit 104 in the signal DI. In some embodiments, the circuit 106 may be internal to the circuit 102.

Figure 3:
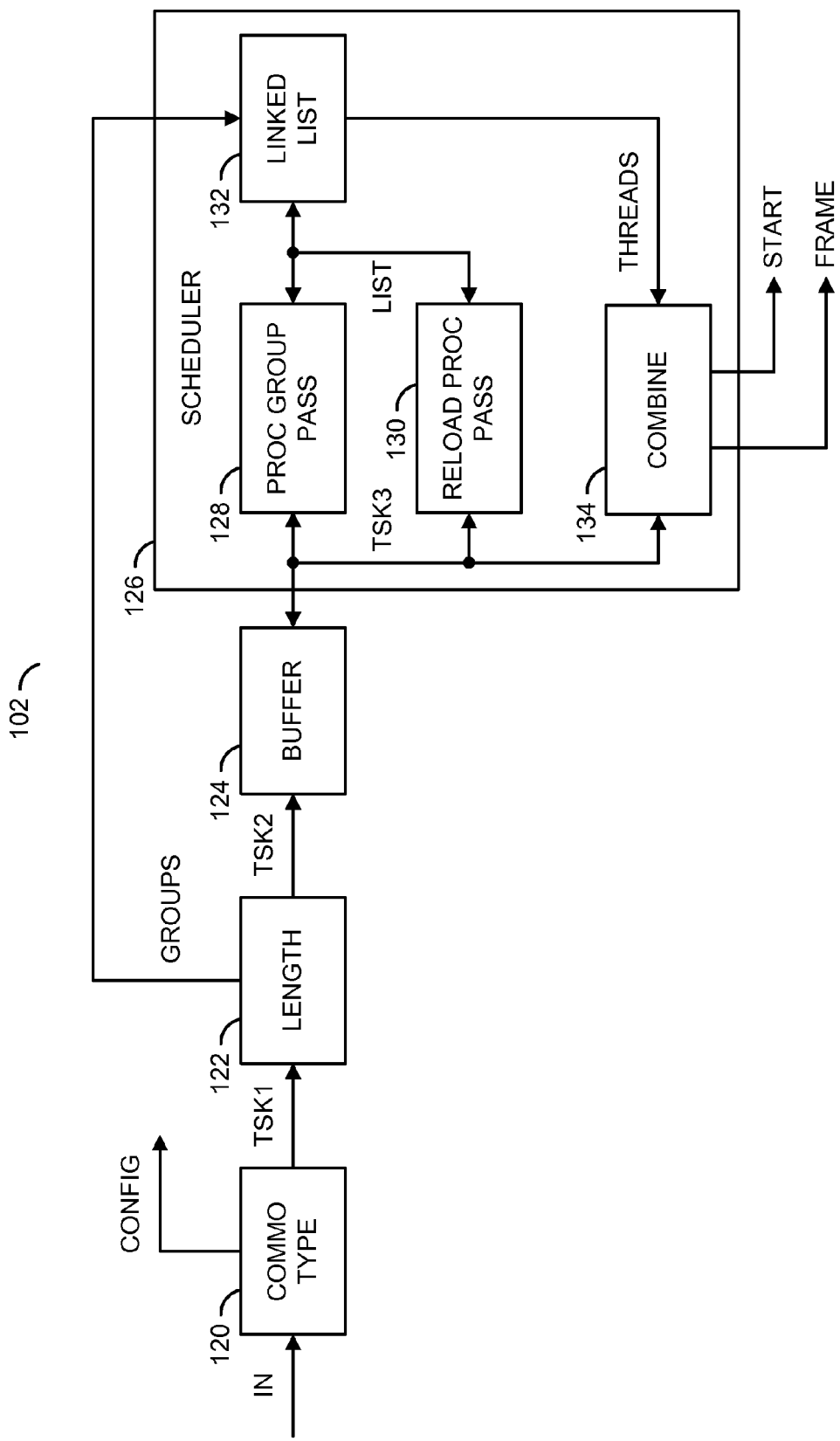
FIG. 3 is a functional block diagram of a main circuit.

Referring to FIG. 3, a functional block diagram of the circuit 102 is shown. The circuit (or apparatus) 102 generally comprises a block (or circuit) 120, a block (or circuit) 122, a block (or circuit) 124 and a block (or circuit) 126. The circuit 126 may comprise a block (or circuit) 128, a block (or circuit) 130, a block (or circuit) 132 and a block (or circuit) 134. The circuits 120 to 134 may represent modules and/or blocks that may be implemented as hardware, firmware, software, a combination of hardware, firmware and/or software, or other implementations.

The signal IN may be received by the circuit 120. The signal CONFIG may be generated by the circuit 120. The circuit 134 may generate the signal START. The signal FRAME may be generated by the circuit 134. An intermediate signal (e.g., TSK1) may be generated by the circuit 120 and received by the circuit 122. An intermediate signal (e.g., TSK2) may be generated by the circuit 122 and received by the circuit 124. The circuit 122 may generate a signal (e.g., GROUPS) presented to the circuit 132. A bidirectional signal (e.g., TSK3) may be exchanged among the circuits 124, 128, 130 and 134. A bidirectional signal (e.g., LIST) may be exchanged among the circuits 128, 130 and 132. The circuit 132 may generate a signal (e.g., THREADS) received by the circuit 134.

The circuit 120 may implement a communications-type determination circuit. The circuit 120 is generally operational to detect the protocol or standard used by the sequence of incoming tasks. A result of the determination may be presented in the signal CONFIG to the circuit 104. In some embodiments, detection of multiple wireless communications standards is generally supported. The wireless communications standards may include, but are not limited to, Wideband-CDMA (e.g., 3GPP Release 7), Code Division Multiple Access 2000 (e.g., 3GPP2), Worldwide Interoperability for Microwave Access (e.g., IEEE 802.16), Long Term Evolution (e.g., 3GPP Release 8) and Digital Video Broadcasting-Return Channel via Satellite. The tasks may be forwarded to the circuit 122 via the signal TSK1.

The circuit 122 may implement a length measuring circuit. The circuit 122 is generally operational to measure a length of each incoming task received in the signal TSK1. A length of a task may be measured by counting a number of bits in each task as the task is received. Depending on the application, the lengths may or may not include any packet or boundary bits that delineate the tasks from each other in the stream. The measured lengths may be organized into groups and transferred to the circuit 132 in the signal GROUPS. Once measured, the tasks may be written into the circuit 124 via the signal TSK2.

The circuit 124 generally implements a buffer circuit. The circuit 124 may be operational to buffer the tasks received in the signal TSK2 and allocation information as received in the signal TSK3. The buffer 124 is generally sized to store one or more frames 108 of the tasks. In some embodiments, the circuit 124 may be implemented as a random access memory circuit. Other memory configurations may be implemented to meet the criteria of a particular application.

The circuit 126 may implement a schedule circuit. The circuit 126 is generally operational to (i) assign each of the tasks to a corresponding one or more of the processors in an initial pass through the tasks. The initial pass may be non-iterative. The circuit 126 may also be operational to reassign the tasks among the processors to shorten a respective load on one or more of the processors in a subsequent pass through the tasks. The subsequent pass may also be non-iterative and generally begins after the initial pass has completed. After the subsequent pass, the circuit 126 may generate a schedule in response to the reassignments. The schedule generally maps the tasks to the processors. Each task may be processed at the same time on all processors to which the task is mapped. The tasks mapped to smaller groups of processors may start after all of the tasks mapped to bigger processor groups containing the smaller groups have finished processing/execution. Starting the smaller processor group tasks after the bigger processor group tasks may guarantee that no delays exist between task executions. The lack of delays may simplify processor controller and help to avoid synchronization overhead issues.

The circuit 126 may further generate a set of threads based on the task lengths and groupings received in the signal GROUPS. Each thread generally corresponds to a respective one of the tasks and identifies one or more of the processors that process the respective task. Furthermore, the circuit 126 may be operational to combine the tasks, the threads and some additional information into a frame 108. Each frame 108 generally has a predefined maximum size. Each frame 108 may contain either a single task of the maximum size or several tasks of one or more smaller sizes.

The circuit 128 may implement a processor group circuit. The circuit 128 is generally operational to perform the initial allocation of the tasks to the individual processors and groups of processors. The initial allocation is generally performed during the initial pass through the tasks. The allocation may be based on the tasks lengths as received from the circuit 132 in the signal LIST. The initial allocation information may be written into the circuit 124 via the signal TSK3.

The circuit 130 may implement a reloading circuit. The circuit 130 is generally operational to perform the reallocation of the tasks among the processors. The reallocation may be performed during the subsequent pass through the tasks. The reallocation may be based on the task loading that each processor was allocated during the initial pass. As the tasks are reassigned among the processors, the reassignment information may be passed to the circuit 132 via the signal LIST. The assignment information held in the circuit 124 may also be updated with the reassignments via the signal TSK3.

The circuit 132 may implement a linked list circuit. The circuit 132 is generally operational to generate and update a linked list of the tasks in a given frame. The original list may be generated based on the task lengths and groups received in the signal GROUPS. The original list is generally presented to the circuit 128 for use during the initial allocation pass. Updates may be made to the lists based on the reassignment information received from the circuit 130 during the subsequent pass. Once the lists have been finalized, the circuit 132 may generate a set of one or more threads. A single thread generally defines which one or more processors will perform the processing for a single task. The thread information may be transferred from the circuit 132 to the circuit 134 via the signal THREADS.

The circuit 134 may implement a combination circuit. The circuit 134 is generally operational to generate the frames 108 by combining the tasks, the threads and any appropriate additional information. Once assembled, each frame may be written into the circuit 106 via the signal FRAME. After a frame 108 has been loaded into the circuit 106, the circuit 134 may assert (or transition) the signal START from a not-ready (or wait) condition (e.g., a logical zero value) to a go (or begin) condition (e.g., a logical one value).

Figure 4:
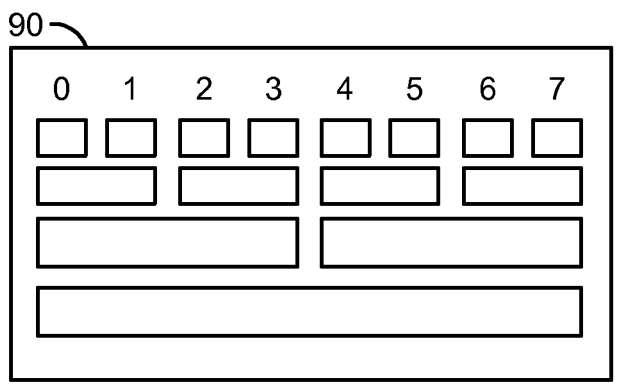
FIG. 4 is a diagram of level information and type information for the group of processors.

Referring to FIG. 4, a diagram of level information and type information for the group of processors 90 is shown. Although the two-pass technique is generally described for a particular case of eight processors, the technique may be easily generalized for other numbers of processors. The technique generally comprises a sequence of task collecting operations followed by task mapping operations.

The task collecting operations may be performed as the tasks are received. Several (e.g., four) possible types of task mappings to the processors may be known at the time of the task collecting. The types may be referred to as a type0 (e.g., where a task is mapped to all eight of the processors), a type1 (e.g., where a task is mapped to four of the processors), a type2 (e.g., where a task is mapped to two of the processors) and a type3 (e.g., where a task is mapped to a single processor).

For each type of mapping, an upper limit of the task length mapped in such type may be defined. If a task length is greater than an upper threshold or limit (e.g., a limit0), the task may be mapped as the type0. A task length between the upper limit and a next limit (e.g., between the limit0 and a limit1) is generally mapped as either the type1 or the type0. A task length between the next limit and a lower limit (e.g., between the limit1 and a limit2) may be mapped as either the type2 or the type1. A task length between the lower limit and a bottom limit (e.g., between the limit2 and a limit3) is generally mapped as either the type3 or the type2. Furthermore, a task length of less than the bottom limit (e.g., less than the limit3) may be mapped only as the type3.

The limit3 may be reasonably set such that all tasks having task lengths less than the limit3 may be assigned to a single processor. Task lengths greater than the limit3 may be effectively parallelized to two or more processors. The tasks with task lengths greater than the limit2 may be effectively parallelized to four or more processors, and so on.

Each limit0-limit3 generally should be powers of two. For example, a task generally does not receive less than a predetermined minimum number (e.g., not less than 40) of clocks on each processor to which the task is mapped. Consider a situation where a task length of at least $2^L$ may be mapped to all of the processors. If L=10, the following limits (e.g., sizes) may be established:

limit0=1024;
limit1=512;
limit2=256; and
limit3=128.

As the incoming tasks are received by the circuit 122, the circuit 122 generally does not sort tasks larger than or matching the limit0. Since all tasks with lengths greater than limit0 may be mapped to all processors, sorting the limit0 tasks is unnecessary and the limit0 tasks may be scheduled in an arbitrary order.

All other tasks shorter than the limit0 may be sorted by the circuit 122 with some precision. In some embodiments, a number of lower bits may be defined which may not be used in sorting. The number of lower bits may be a parameter (e.g., sortPrecision). If two tasks whose lengths differ only in the lower bits, the two tasks may have similar lengths and so sorted into the same group. Therefore, the whole task stream is generally distributed into $2^{\{log\ 2(limit0) - sortPrecision\}} + 1$ (e.g., $2^{\{10 - sortPrecision\}} + 1$) groups, where 10 may be log 2(limit0)=L. Sorting the task lengths by the limits may be done on-the-fly with linear complexity. Consider an example where the parameter sortPrecision=3 and L=10, so the limit0=$2^L$=1024. The number of groups may be defined as $2^{(L-sortPrecision)}+1=2^7+1=129$.

Distribution (or allocation or parsing) of the tasks to the groups may be done in the following way:

```
int getGroupNo(int taskLength) {
    return (taskLength >= limit0) ? 0 :
        2^{log2(limit0)-sortPrecision} - (taskLength >> sortPrecision);
}
```

The function A?B:C generally returns B if A is true and returns C if A is false. The function ">>" may be a right shift of the binary value with bits shifted right of a radix point being discarded. Using the technique, the groups may be enumerated in descending order starting with the group with the largest tasks. The enumerations for the task lengths may be transferred from the circuit 122 to the circuit 132 via the signal GROUPS.

The circuit 132 may link all tasks within a single group into a list on-the-fly (e.g., as the task lengths are received) during the task stream processing. New incoming task enumerations received via the signal GROUPS are generally inserted to the beginning of the appropriate list. The lists may be presented to the circuits 128 and 130 via the signal LIST.

When distribution of the tasks among the groups is finished, all groups may also be linked in a corresponding master linked list such that the latest task in a previous group is linked to an initial task in a next group. By way of example, consider a sequence of incoming task lengths: 156, 234, 64, 240, 1043, 233, 66, 235, 67, 332, 1599 and 231.

Distribution between groups by the circuit 122 may result in:
  Group 0: Task lengths 1599 and 1043
  Group 87: Task length 332
  Group 98: Task length 240
  Group 99: Task lengths 235, 233 and 234
  Group 100: Task length 231
  Group 109: Task length 156
  Group 120: Task lengths 67, 66 and 64

For example, the task length 234 may be represented in binary as 0001 1101 010. The right shift by three bits may alter the representation to 0001 1101 (decimal 29). The group number for task length 234 may be calculated as $2^{(10-3)}-29=99$. When the task length 233 is evaluated, the circuit 122 may calculate the group number as 99. The circuit 132 may link the task length 233 ahead of the task length 234 in the group 99. Likewise, the task length of 235 is evaluated, the circuit 122 may calculate the group number as 99. The circuit 132 may link the task length 235 ahead of the task length 233 in the group 99. Once all of the groups have been linked, the circuit 132 may link the lists, starting with group 0. The resulting linked list may be as follows:

1599→1043→332→240→235→233→234→231→156→67→66→64

The task mapping is generally done in two stages. In an initial stage (e.g., the initial mapping pass), all of the tasks in the linked list generated by the circuit 132 may be mapped one-by-one to the processor group with the least load. In a subsequent stage (e.g., the subsequent mapping pass), all of the processor groups may be evaluated to shorten the loads.

In the initial stage, the circuit 128 may walk through all of the tasks held in the buffer 124 starting with the group 0 tasks (e.g., the group with the longest tasks). After the group 0 tasks are allocated, the circuit 124 generally walks through the other groups in descending order of the tasks lengths. Each task outside the group 0 tasks may be mapped in two different ways depending on length and the limits (e.g., limit0, limit1, limit2 and limit3). In the initial mapping pass, a task may be allocated to the type with the fewer number of processors (e.g., if the task may be mapped as type1 and type2, type2 is chosen).

Figure 5:
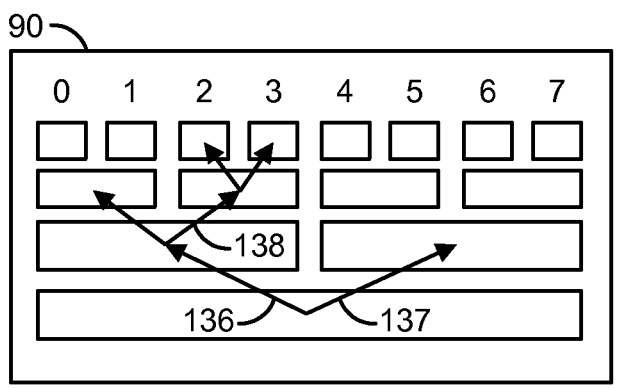
FIG. 5 is a diagram of a task being allocated in the group of processors.

Referring to FIG. 5, is a diagram of a task being allocated in the group of processors is shown. For allocations among the processor groups at the same level, a processor group with the least load may be selected as follows. Each processor group may be encoded with a multiple (e.g., 4) bit value, as illustrated in FIGS. 4 and 5, where "xxx" may be an encoding of the group number in current level (e.g., the least significant bit on the right). Suppose that the task should be mapped to a group of the type3 (e.g., corresponds to the level3). Starting from the level0, a minimal load between the two level1 groups of processors may be compared. If left group 136 has a smaller load than the right group 137, the left group 136 may be selected. Otherwise, The right group 137 may be selected. The procedure may be repeated from the winning level1 group of processors by comparing the level2 groups of processors. From the winning level2 group of processors (e.g., 138), the comparing may continue at the level3, and so on. Finally, the current task may be mapped to the winning level3 group (e.g., group 2 at level3). At each step, an X bit in the group encoding may be set. Therefore, the comparing operation generally has a logarithmic dependence from the number of processors.

After the final group is chosen (e.g., the task is mapped to group 1011=processor 3), the minimal load of each processor group may be updated as follows. For the chosen group, the average load of the task may be added to the processor(s) of the group (e.g., the task length divided to the number of processors). For all groups containing the chosen group, a minimum load of the subgroups may be calculated (e.g., for group 0011=processors 4-7), the load may be a minimum of the loads of the groups 0110 (e.g., processors 4-5) and 0111 (e.g., processors 6-7). The new load may be added for all groups contained in the group 0011. Generally, the load of all contained groups may be updated when switching from a task of type i to a task of type i+1.

Figure 6:
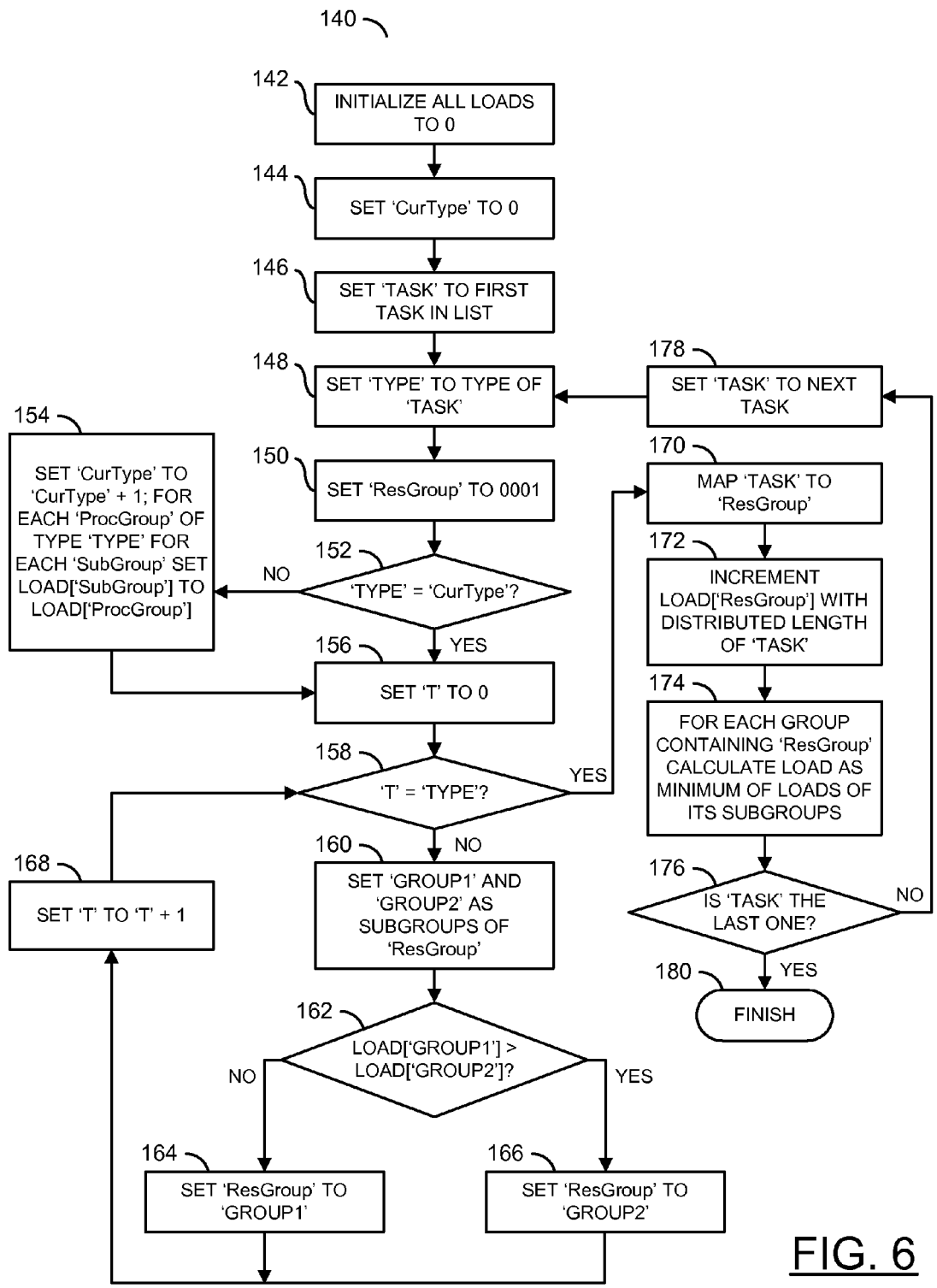
FIG. 6 is a flow diagram of a method for an initial mapping pass.

Referring to FIG. 6, a flow diagram of a method 140 for an initial mapping pass is shown. The method (or process) 140 may be performed by the circuit 128. The method 140 generally comprises a step (or state) 142, a step (or state) 144, a step (or state) 146, a step (or state) 148, a step (or state) 150, a step (or state) 152, a step (or state) 154, a step (or state) 156, a step (or state) 158, a step (or state) 160, a step (or state) 162, a step (or state) 164, a step (or state) 166, a step (or state) 168, a step (or state) 170, a step (or state) 172, a step (or state) 174, a step (or state) 176, a step (or state) 178 and a step (or state) 180. The steps 142 to 180 may represent modules and/or blocks that may be implemented as hardware, firmware, software, a combination of hardware, firmware and/or software, or other implementations.

In the following example, assume that all of the tasks may already be linked into a list as described below. In the step 142, all group loads may be initialized (e.g., set to zero). A current type value (e.g., CurType) may be initialized (e.g., set to zero) in the step 144. In the step 146, the circuit 128 may set a task value (e.g., TASK) to an initial task in the list. A type value (e.g., TYPE) may be set to the type of the value task in the step 148. In the step 150, a chosen processor group value (e.g., ResGroup) may be set to an initial group (e.g., group 0001).

The circuit 128 may compare the type to the current type in the step 152. If the type does not match the current type, the method 140 generally continues with the step 154. In the step 154, the current type may be updated to a next current type (e.g., CurType+1). For each processor group (e.g., ProcGroup) of the type, for each subgroup (e.g., SubGroup) in a linear array (e.g., LOAD[i]), a load entry in the array for the subgroup (e.g., LOAD[SubGroup]) is generally set to the load entry in the array for the processor group (e.g., LOAD[ProcGroup]) in the step 154. The method 140 may continue with the step 156. If the type matches the current type, the method may continue with the step 156.

In the step 156, a counter value (e.g., T) may be initialized to a beginning value (e.g., set to zero). The counter value may be compared with the type in the step 158. If the counter value does not match the type, the method 140 may continue with the step 160. If the counter value matches the type, the method may continue with the step 170 to update the load of all contained groups.

If the counter value does not match the type, the method 140 may establish a pair of groups (e.g., GROUP1 and GROUP2) as the subgroups of the chosen processor group in the step 160. In the step 162, the circuit 128 may compare a load of the particular group (e.g., LOAD[GROUP1]) with a load of the other group (e.g., LOAD[GROUP2]). If the load of the particular group is greater than the load of the other group, the chosen processor group may be set to the particular group in the step 164. If not, the chosen processor group may be set to the other group in the step 166. In the step 168, the counter value may be incremented and compared with the type again in the step 158.

If the counter value matches the type, the task may be mapped to the chosen processor group in the step 170 to calculate the load of each processor in the group caused by the task. The load of the chosen processor group (e.g., LOAD[ResGroup]) may be updated with the distributed length of the task in the step 172. In the step 174, for each group containing the chosen processor group, a load may be calculated as a minimum of the loads of the subgroups. If the task is not the last task, the step 178 generally updates the task to the next tasks. The method 140 may subsequently return to the step 148 to process the next task. If the task was the last task, the method 140 may end in the step 180. The initial mapping (or assignments) of the tasks to the processors may be stored in the circuit 124 via the signal TSK3.

Figure 7:
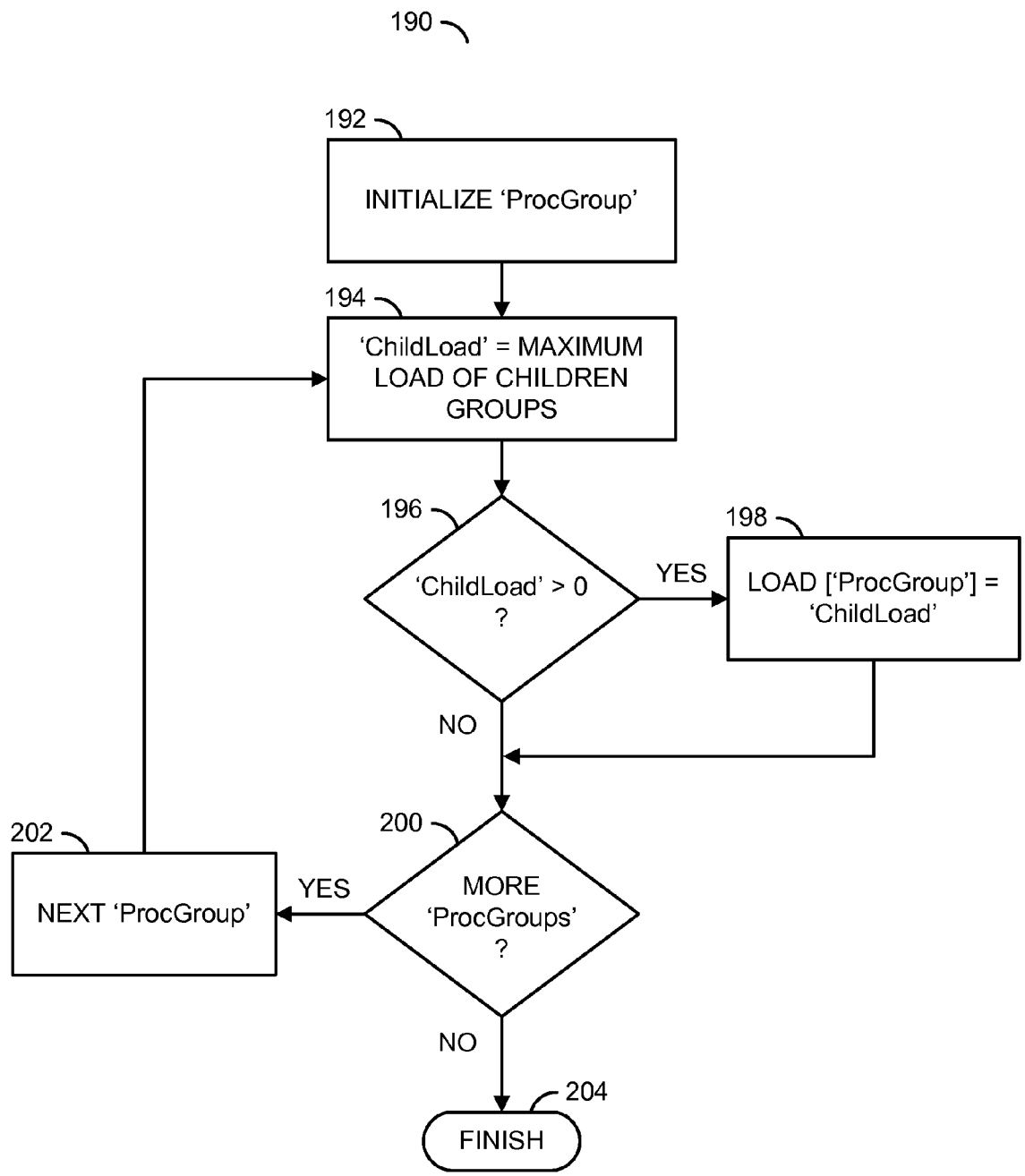
FIG. 7 is a flow diagram of a method for calculating a maximum load of each processor group.

Referring to FIG. 7, a flow diagram of a method 190 for calculating a maximum load of each processor group is shown. The method (or process) 190 may be performed by the circuit 130. The method 190 generally comprises a step (or state) 192, a step (or state) 194, a step (or state) 196, a step (or state) 198, a step (or state) 200, a step (or state) 202 and a step (or state) 204. The steps 192 to 204 may represent modules and/or blocks that may be implemented as hardware, firmware, software, a combination of hardware, firmware and/or software, or other implementations.

In the step 192, the value ProcGroup may be initialized to a particular processor group (e.g., ProcGroup=7). In the step 194, a child load value (e.g., ChildLoad) may be set to the maximum load of the children groups. A check that the child load is greater than zero may be performed in the step 196. If the child load is greater than zero, the load of the processor group may be set to the child load in the step 198. The method 190 may continue with the step 200. If the child load is zero, the method 190 may also continue with the step 200. In the step 200, a check may be performed to see of more processor groups exist. If more groups exist, the method 190 may select the next processor group in the step 202 and return to the step 194. Once all of the groups have been considered, the method 190 may end in the step 204.

The subsequent mapping pass performed by the circuit 130 generally attempts to shorten the load of the most loaded processors. In the subsequent pass, the circuit 130 generally walks through all of the processor groups starting with group0 (e.g., group 0001) trying to reduce the load of the group. For the current group, a difference between the maximum load of two subgroups may be calculated (e.g., for the group 0001 a difference may be calculated between the load of the left subgroup 0010 and the right subgroup 0011). Suppose that the load of the subgroup 0010 is less than the load of the subgroup 0011.

In the case of the subgroup 0011, the circuit 130 generally looks for a task mapped to the subgroup 0011 during the initial mapping pass whose distributed length (e.g., length divided to number of loaded processors) is less than double the difference between the load of the subgroup 0011 and the subgroup 0010. If such a task is found, the task may be remapped by the circuit 130 to a higher type or level (e.g., from the group 0011 to the group 0001). The maximum load of the processors in the group 0001 generally decreases due to the remapping. When a task to remap is found or all tasks with a specified type are processed, the next processor group (e.g., group 0010) may be evaluated.

Figure 8:
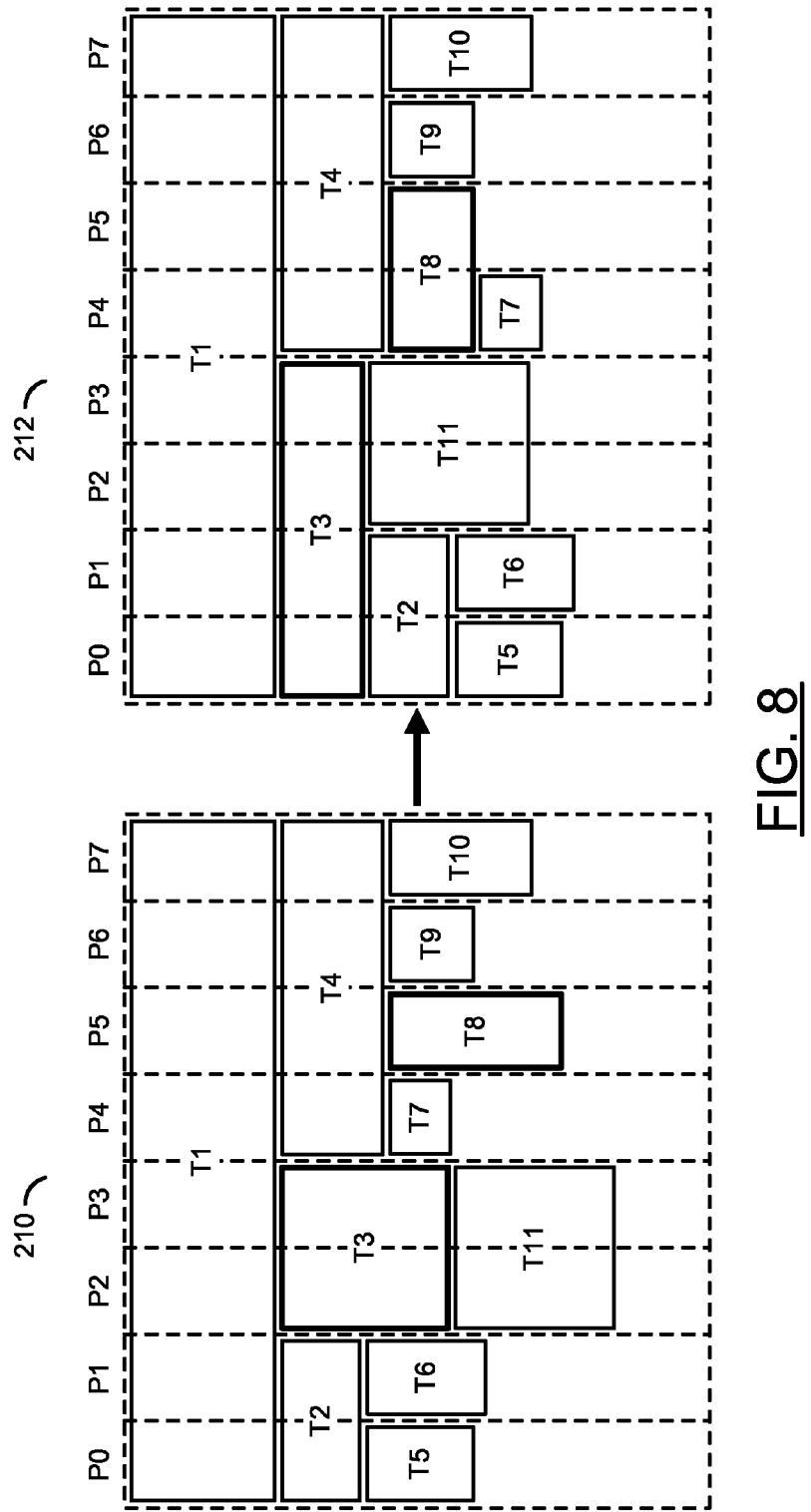
FIG. 8 is a diagram illustrating an example remapping of tasks.

Referring to FIG. 8, a diagram illustrating an example remapping of tasks is shown. In the example, a distribution 210 of several tasks (e.g., T1-T11) is generally illustrated on the left side and a final distribution 212 of the tasks T1-T11 is generally illustrated on the right side of the figure.

At the start of the subsequent mapping pass, an initial processor group targeted to reduce the load may be the group 0001 (e.g., level0 with all eight processors P0-P7 operating in parallel). The remapping may consider the loads on the subgroups of the group 0001. In the example, the load of the left subgroup 0010 (e.g., the area shown in the columns for the processors P0-P3) may be greater than the load of the right subgroup 0011 (e.g., the area shown in the columns for the processors P4-P7). However, no tasks may be available in the subgroup 0010 to remap, so a next group may be investigated.

The next group in which remapping may be considered is the group 0010. The load of the right subgroup 0101 (e.g., the area in the columns for the processors P2 and P3) is generally greater than the load of the left subgroup 0100 (e.g., the area in the columns for the processors P0 and P1). Therefore, a search may be performed for one or more tasks mapped to the group 0101 having a distributed length less than double the difference between the loads of the subgroups 0100 and 0101. In the example, the task T3 generally satisfies the distributed length condition. The task T3 may be remapped in the subsequent mapping pass from the group 0101 (e.g., the processors P2 and P3) to the group 0010 (e.g., the processors P0-P3). Since no other tasks exist in the group 0101 that satisfy the distributed length condition, the remapping may proceed with the group 0011 (e.g., the processors P4-P7).

For the group 0011, no tasks may exist which could be mapped to the subgroups 0110 and 0111. The remapping may switch to the processor group 0100 (e.g., the processors P0-P1). Here a doubled difference between the loads of subgroups 1000 and 1001 is generally less than all initially mapped tasks lengths, so no remapping may be performed. Likewise for the processor group 0101 (e.g., the processors P2-P3), no tasks may be available to remap to the subgroups.

Switching to the group 0110 (e.g., the processors P4-P5), tasks T7 and T8 may be mapped to subgroups 1100 and 1101. The load of the task T8 may be greater than the load of the task T7. Since the length of the task T8 is less than doubled the difference between whole loads of the subgroups, the task T8 may be remapped within the parent processor group 0110. After remapping, the task T8 may be allocated to both the processor P4 and the processor P5. Finally, the processor group 0111 may not contain any tasks suitable for remapping. The resulting remapped allocations are generally shown on the right side 212 with the tasks T3 and T8 having been remapped.

Figure 9:
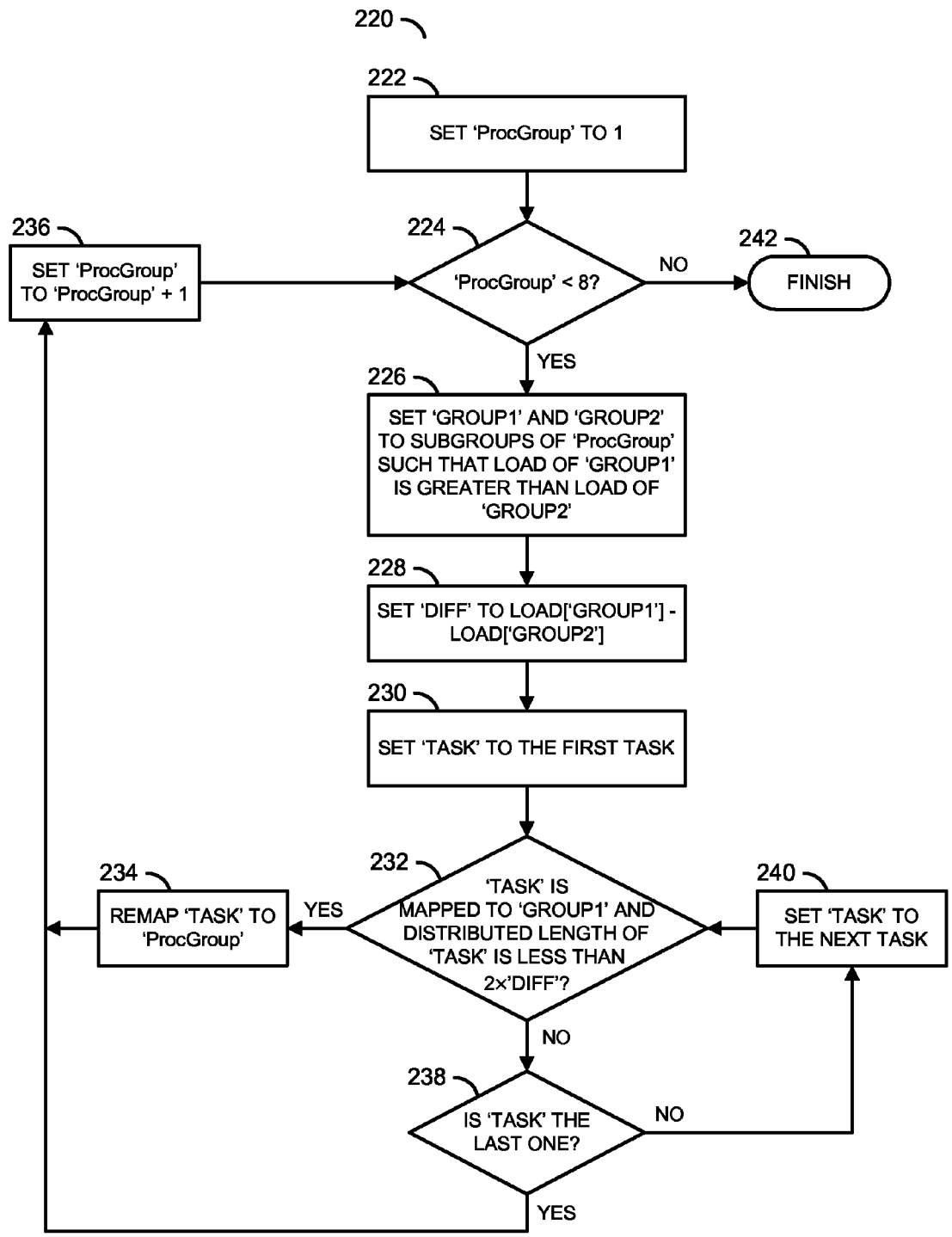
FIG. 9 is a flow diagram of a method for a subsequent mapping pass.

Referring to FIG. 9, a flow diagram of a method 220 for the subsequent mapping pass is shown. The method (or process) 220 may be performed by the circuit 130. The method 220 generally comprises a step (or state) 222, a step (or state) 224, a step (or state) 226, a step (or state) 228, a step (or state) 230, a step (or state) 232, a step (or state) 234, a step (or state) 236, a step (or state) 238, a step (or state) 240 and a step (or state) 242. The steps 222 to 242 may represent modules and/or blocks that may be implemented as hardware, firmware, software, a combination of hardware, firmware and/or software, or other implementations.

In the step 222, the processor group may be initialized to a starting group (e.g., ProcGroup=1). A check of the processor group is generally performed in the step 224 to determine if the current processor group is a last group or not. If the processor group is not the last group (e.g., ProcGroup<8), the method 220 may continue with the step 226. In the step 226, a pair of groups (e.g., GROUP1 and GROUP2) may be defined as the subgroups of the processor group. The definition may establish that the load of a given group is greater than the load of the other group (e.g., GROUP1>GROUP2). In the step 228, a difference value (e.g., DIFF) may be calculated as a different between the given group load and the other group load. The task may be set to the initial task in the step 230.

The method 220 generally considers the task and the difference value in the step 232. If the task is mapped to the given group and a distributed length of the task is less than twice the difference value, the method 220 may continue with the step 234. In the step 234, the task may be remapped to the processor group. In the step 236, the processor group may be updated to the next processor group and the method 220 returns to the step 224. If the task is not mapped to the given group and/or the distributed length of the task is not less than twice the difference value, the method 220 may continue with the step 238.

The step 238 generally determines if the task is the last of the processor group. If the processor group has more tasks, the task may be set to the next task in the step 240. The method 220 may then return to the step 232. If the task is the last task, the method 220 may continue with the step 236 to advance to the next processor group. Once all of the processor groups have been considered, the subsequent mapping pass may be ended in the step 242.

For all of the tasks to be ordered by the mapping types, all of the tasks remapped during the subsequent mapping pass may be moved to corresponding positions in the linked list (or chain) by the circuit 132. For example, the remapped tasks may be moved to an end of the tasks of a previous level. Adjusting the linked list may be also done on-the-fly during the remapping process. Therefore, the circuit 132 may remember the last task with a less type in the chain.

Note that the distribution of tasks between the processors obtained by the two-pass technique generally has the following properties. Each task may be processed at the same time on all processors to which the task is mapped. As such, the lengths of all of the tasks illustrated in FIG. 8 may be represented as rectangles. Furthermore, the tasks mapped to smaller groups of processors may start (e.g., begin processing or execution) after all of the tasks mapped to bigger processor groups containing the smaller groups have finished processing/execution. As illustrated, all of the bigger rectangles may be above the smaller rectangles. The processor or execution of the larger tasks before the smaller tasks generally guarantees that no delays may be created between task processing/execution. The absence of gaps may simplify processor controller and may avoid synchronization overheads.

Figure 10:
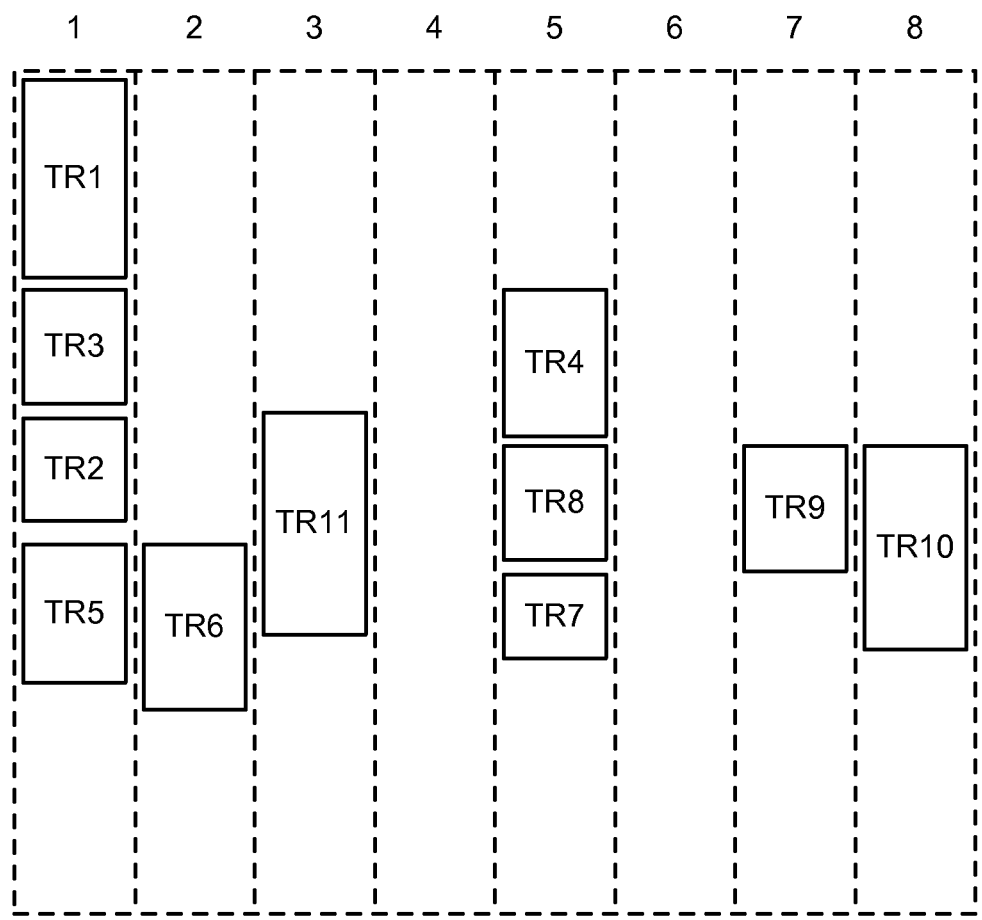
FIG. 10 is a diagram of threads created for the remapped tasks.

Referring to FIG. 10, a diagram of threads created for the remapped tasks of FIG. 8 is shown. The circuit 132 may generate an initial linked list based on the tasks lengths received in the signal GROUPS. The linked list may be updated by the circuit 132 during the remapping pass to account for the remapped tasks (e.g., the tasks T3 and T8). The final linked list may be used to generate multiple threads (e.g., TR1-TR11), a thread TR1-TR11 for each respective task T1-T11. The threads TR1-TR11 generally identify which one or more of the processors P0-P7 is responsible for executing the respective task T1-T11. The threads TR1-TR11 may also provide temporal instructions for when to execute the respective tasks T1-T11. The threads TR1-TR11 may be transferred to the circuit 134 via the signal THREADS. The circuit 132 may insert the threads into the frame with the tasks.

In the example shown, the task T1 may be processed/executed alone by all eight processors P0-P7. Therefore, the thread TR1 may start alone. Once the task T1 has finished, the tasks T3 and T4 may be processed/executed by four of the processors P0-P7 each. The two parallel tasks T3 and T4 may be controlled by two parallel threads TR3 and TR4. The threads TR3 and TR4 may begin at the same time, immediately after the thread TR1 ends. The completion of the thread TR3 may trigger the parallel start of the threads T2 and T11. The completion of the thread TR4 may trigger the parallel start of the threads T8, T9 and T10. When the thread TR2 ends, the threads TR5 and TR6 may be started. When the thread TR8 ends, the thread TR7 may be started. Once the thread TR6 has completed, processing/execution of the tasks T1-T11 may be finished.

Experimental results generally show that distributions obtained using the two-pass technique have an overhead compared with an optimal distribution of not more than 1% for small number of tasks (e.g., 50 tasks) and less than 0.5% for large numbers of tasks (e.g., >100 tasks). The two-pass task scheduler technique may be used in any design, method or process that schedules incoming tasks among multiple processors units. The two-pass task scheduler technique may be suitable for designs that implement fast scheduling because a complexity of the task scheduling technique may be linear for both the number of processors and the number of tasks. Generally, the two-pass scheduler technique may be implemented for multiple processors numbered at a power of two. No upper bound may exist on the number of processors supported by the technique. Furthermore, no restrictions may exist in the technique for the number of incoming tasks to be mapped and remapped. The two-pass technique may be configured for different environment settings using different limits and may allow generalizing to more complex mapping rules. In some embodiments, the two-pass technique may be implemented as part of a turbo decoder to schedule a sequence of incoming codewords between multiple maximum a posteriori decoder units (or processors).

The functions performed by the diagrams of FIGS. 2, 6, 7 and 9 may be implemented using one or more of a conventional general purpose processor, digital computer, microprocessor, microcontroller, RISC (reduced instruction set computer) processor, CISC (complex instruction set computer)

processor, SIMD (single instruction multiple data) processor, signal processor, central processing unit (CPU), arithmetic logic unit (ALU), video digital signal processor (VDSP) and/or similar computational machines, programmed according to the teachings of the present specification, as will be apparent to those skilled in the relevant art(s). Appropriate software, firmware, coding, routines, instructions, opcodes, microcode, and/or program modules may readily be prepared by skilled programmers based on the teachings of the present disclosure, as will also be apparent to those skilled in the relevant art(s). The software is generally executed from a medium or several media by one or more of the processors of the machine implementation.

The present invention may also be implemented by the preparation of ASICs (application specific integrated circuits), Platform ASICs, FPGAs (field programmable gate arrays), PLDs (programmable logic devices), CPLDs (complex programmable logic device), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The present invention thus may also include a computer product which may be a storage medium or media and/or a transmission medium or media including instructions which may be used to program a machine to perform one or more processes or methods in accordance with the present invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (electronically programmable ROMs), EEPROMs (electronically erasable ROMs), UVPROM (ultra-violet erasable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, storage and/or playback devices, video recording, storage and/or playback devices, game platforms, peripherals and/or multi-chip modules. Those skilled in the relevant art(s) would understand that the elements of the invention may be implemented in other types of devices to meet the criteria of a particular application.

As would be apparent to those skilled in the relevant art(s), the signals illustrated in FIGS. 2 and 3 represent logical data flows. The logical data flows are generally representative of physical data transferred between the respective blocks by, for example, address, data, and control signals and/or busses.

The system represented by the circuit 100 may be implemented in hardware, software or a combination of hardware and software according to the teachings of the present disclosure, as would be apparent to those skilled in the relevant art(s). As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the scope of the invention.

The invention claimed is:

1. A method for two-pass scheduling of a plurality of tasks, comprising the steps of:
  (A) assigning each of said tasks to a corresponding one or more of a plurality of processors in a first pass through said tasks using a circuit, wherein (i) said first pass is non-iterative and (ii) at least one of said tasks is assigned to run on two or more of said processors in parallel;
  (B) reassigning said tasks among said processors to shorten a respective load on one or more of said processors in a second pass through said tasks, wherein said second pass (i) is non-iterative and (ii) begins after said first pass has completed; and
  (C) generating a schedule in response to said assigning and said reassigning, wherein said schedule maps said tasks to said processors,
  wherein said reassigning of said tasks in said second pass changes at least one of said tasks from being mapped to a single one of said processors to being mapped to at least two of said processors.

2. The method according to claim 1, wherein a complexity of scheduling said tasks is linear in response to both a number of said tasks and a number of said processors.

3. The method according to claim 1, further comprising the step of:
  generating a list of said tasks prior to said first pass, wherein said list is sorted by a plurality of respective lengths of said tasks.

4. The method according to claim 3, wherein said assigning of said tasks to said processors in said first pass is performed in an order defined by said list.

5. The method according to claim 4, wherein a longest of said tasks is assigned first and a shortest of said tasks is assigned last.

6. The method according to claim 1, wherein during said first pass (i) said tasks having a corresponding length shorter than a first threshold are assigned to a single one of said processors and (ii) said tasks having said corresponding length greater than a second threshold are assigned to all of said processors.

7. The method according to claim 1, wherein said schedule comprises a plurality of threads, wherein each of said threads (i) corresponds to a respective one of said tasks and (ii) identifies said one or more processors that process said respective task.

8. The method according to claim 1, wherein said schedule adjoins said tasks mapped to a given one of said processors such that no gaps exist in processing said adjoining tasks.

9. An apparatus comprising:
  a memory configured to buffer a plurality of tasks; and
  a circuit configured to (i) assign each of said tasks to a corresponding one or more of a plurality of processors in a first pass through said tasks, wherein (a) said first pass is non-iterative and (b) at least one of said tasks is assigned to run on two or more of said processors in parallel, (ii) reassign said tasks among said processors to shorten a respective load on one or more of said processors in a second pass through said tasks, wherein said second pass (a) is non-iterative and (b) begins after said first pass has completed, and (iii) generate a schedule in response to said assign and said reassign, wherein said schedule maps said tasks to said processors, wherein said reassigning of said tasks in said second pass changes at least one of said tasks from being mapped to a single one of said processors to being mapped to at least two of said processors.

10. The apparatus according to claim 9, wherein a complexity of scheduling said tasks is linear in response to both a number of said tasks and a number of said processors.

11. The apparatus according to claim 9, wherein (i) said circuit is further configured to generate a list of said tasks prior to said first pass and (ii) said list is sorted by a plurality of respective lengths of said tasks.

12. The apparatus according to claim 11, wherein said assigning of said tasks to said processors in said first pass is performed in an order defined by said list.

13. The apparatus according to claim 12, wherein a longest of said tasks is assigned first and a shortest of said tasks is assigned last.

14. The apparatus according to claim 9, wherein during said first pass (i) said tasks having a corresponding length shorter than a first threshold are assigned to a single one of said processors and (ii) said tasks having said corresponding length greater than a second threshold are assigned to all of said processors.

15. The apparatus according to claim 9, wherein said schedule comprises a plurality of threads, wherein each of said threads (i) corresponds to a respective one of said tasks and (ii) identifies said one or more processors that process said respective task.

16. The apparatus according to claim 9, wherein said circuit and said processors form a decoder.

17. The apparatus according to claim 10, wherein said apparatus is implemented as one or more integrated circuits.

18. An apparatus comprising:
- means for assigning each of a plurality of tasks to a corresponding one or more of a plurality of processors in a first pass through said tasks, wherein (i) said first pass is non-iterative and (ii) at least one of said tasks is assigned to run on two or more of said processors in parallel;
- means for reassigning said tasks among said processors to shorten a respective load on one or more of said processors in a second pass through said tasks, wherein said second pass (i) is non-iterative and (ii) begins after said first pass has completed; and
- means for generating a schedule in response to said assigning and said reassigning, wherein said schedule maps said tasks to said processors, wherein said reassigning of said tasks in said second pass changes at least one of said tasks from being mapped to a single one of said processors to being mapped to at least two of said processors.

\* \* \* \* \*